United States Patent [19]
Sansone et al.
[11] Patent Number: 4,962,454
[45] Date of Patent: Oct. 9, 1990

[54] BATCH MAILING METHOD AND APPARATUS: PRINTING UNIQUE NUMBERS ON MAIL PIECES AND STATEMENT SHEET

[75] Inventors: Ronald P. Sansone, Weston; Michael P. Taylor, Norwalk; Terrence M. Doeberl, West Redding, all of Conn.

[73] Assignee: Pitney Bowes Inc., Stamford, Conn.

[21] Appl. No.: 813,445

[22] Filed: Dec. 26, 1985

[51] Int. Cl.[5] .............. G06K 21/06
[52] U.S. Cl. .............. 364/464.02; 235/495
[58] Field of Search .............. 364/464.02, 478, 466, 364/900, 464.01; 235/375, 380, 495

[56] References Cited

U.S. PATENT DOCUMENTS

| | | | |
|---|---|---|---|
| 710,997 | 10/1902 | Pitney . | |
| 3,652,795 | 5/1972 | Wolf et al. | 364/406 |
| 3,832,946 | 9/1974 | Lupkas . | |
| 3,869,986 | 3/1975 | Hubbard . | |
| 4,097,923 | 6/1978 | Eckert, Jr. et al. | 364/900 |
| 4,122,532 | 10/1978 | Dlugos . | |
| 4,168,533 | 9/1979 | Schwartz . | |
| 4,286,325 | 8/1981 | Dlugos et al. | 364/900 |
| 4,319,328 | 3/1982 | Eggert . | |
| 4,335,434 | 6/1982 | Baumann et al. | 364/464 |
| 4,393,454 | 7/1983 | Soderberg | 235/432 |
| 4,447,890 | 5/1984 | Duwel et al. | 364/900 |
| 4,511,793 | 4/1985 | Racanelli | 364/466 |
| 4,527,790 | 7/1985 | Piotroski | 364/478 |
| 4,574,352 | 3/1986 | Coppola et al. | 364/466 |
| 4,639,873 | 1/1987 | Baggarty et al. | 364/478 |
| 4,641,347 | 2/1987 | Clark et al. | 235/432 |
| 4,713,761 | 12/1987 | Sharpe et al. | 364/406 |
| 4,725,718 | 2/1988 | Sansone et al. | 235/495 |

FOREIGN PATENT DOCUMENTS

| | | |
|---|---|---|
| 947991 | 1/1964 | United Kingdom . |
| 2048779 | 12/1980 | United Kingdom . |
| 2139147 | 5/1983 | United Kingdom . |

OTHER PUBLICATIONS

"Document 1" 46 pages, The Pitney Bowes Computerized Parcel Shipping System is Far Simpler than it Sounds, System Description, Background and Service Agreement, Pitney Bowes Incorporated, 1984.

*Primary Examiner*—Parshotam S. Lall
*Assistant Examiner*—S. A. Melnick
*Attorney, Agent, or Firm*—Donald P. Walker; Melvin J. Scolnick; David E. Pitchenik

[57] ABSTRACT

A system for processing batch mail in which the need for on-site inspection is unnecessary. A mail sender purchases postage from a central station thereby authorizing him to send mail equal to the amount of postage purchased. The mail sender processes batches of mail each batch being accompanied by a statement summarizing the type and number of mail pieces sent and amount of postage for that batch. The statement contains data that allows mail payment verification.

24 Claims, 5 Drawing Sheets

BATCH MAILING METHOD AND APPARATUS: PRINTING UNIQUE NUMBERS ON MAIL PIECES AND STATEMENT SHEET

RELATED CASES

Subject matter similar to the subject matter contained in the instant application may be found in U.S. patent application entitled "POSTAGE AND MAILING INFORMATION APPLYING SYSTEM" by Ronald Sansone and et al, filed Aug. 6, 1985, having Ser. No. 762,994 now U.S. Pat. No. 4,725,718 and assigned to the assignee of the instant application.

BACKGROUND OF THE INVENTION

Certain organizations dispatch large amounts of mail on a periodic basis. Examples of such organizations are: banking institutions, utility companies, insurance companies, credit companies, and the like. With such large quantities, these mail-pre-package and pre-sort their mail and are given a lower postage rate by the postal service because of the time saved by the postal service. There are generally two ways such mail senders can apply postage to their mail. The most common way is by use of a postage meter which is leased by the mail sender from a postage meter manufacturer with which the requisite postage is applied to each mail piece. Inserter systems have been developed whereby inserts may be placed into an envelope and the envelope may be sealed, addressed and have a postage indicia applied thereto. The mail pieces may be weighed on the fly or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mail sender places a permit number on the mail pieces and prepares a manifest listing that shows the type and number of mail pieces being mailed on each occasion and the postage required.

With both systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part the postal service by examining the records of the mail user on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced relatively frequently because of wear. With regard to the permit mail system, the shortcoming lies in the need of the postal service to send a representative frequently to the various mail sender locations to ensure that the mail sender is accurately accounting for the quantity of mail being sent. Such a scheme is not totally reliable as it relies upon on-site verification using the mail senders records which are not secure.

SUMMARY AND OBJECTS OF THE INVENTION

A system has been conceived whereby a mail sender will be able to send large quantities or batches of mail without the need of on-site inspections. This is accomplished by the mail sender having a secure accounting unit similar to a postage meter in which postage value is placed by a dispensing or central station. A statement, accompanying each batch of mail, which statement contains information relative to the mail and the amount of postage required.

Communication between the central station and the mail sender allows postage value to be transferred to the mail sender, or user, by the central station and mailing and verification data to be sent to the central station from the mail sender. The mailing and verification data will be the same as that contained on the mailing statements that accompany the batches of mail. This system provides a central station for a large number of mail senders whereby the postal service is relieved of its obligation of having onsite inspections and the central station acts as a clearing house for the postal service through whom verification of postage can be conveniently and inexpensively achieved.

Another feature of the instant invention is that a unique serial number may be provided to the user to be stored in permanent memory to identify the user's accounting unit.

A further feature of this invention is that the security features of a postage meter are provided while allowing a high speed, relatively inexpensive printer to be used for printing the mail pieces.

DETAILED DESCRIPTION OF THE PREFERRED EMBODIMENT

Figure 1:
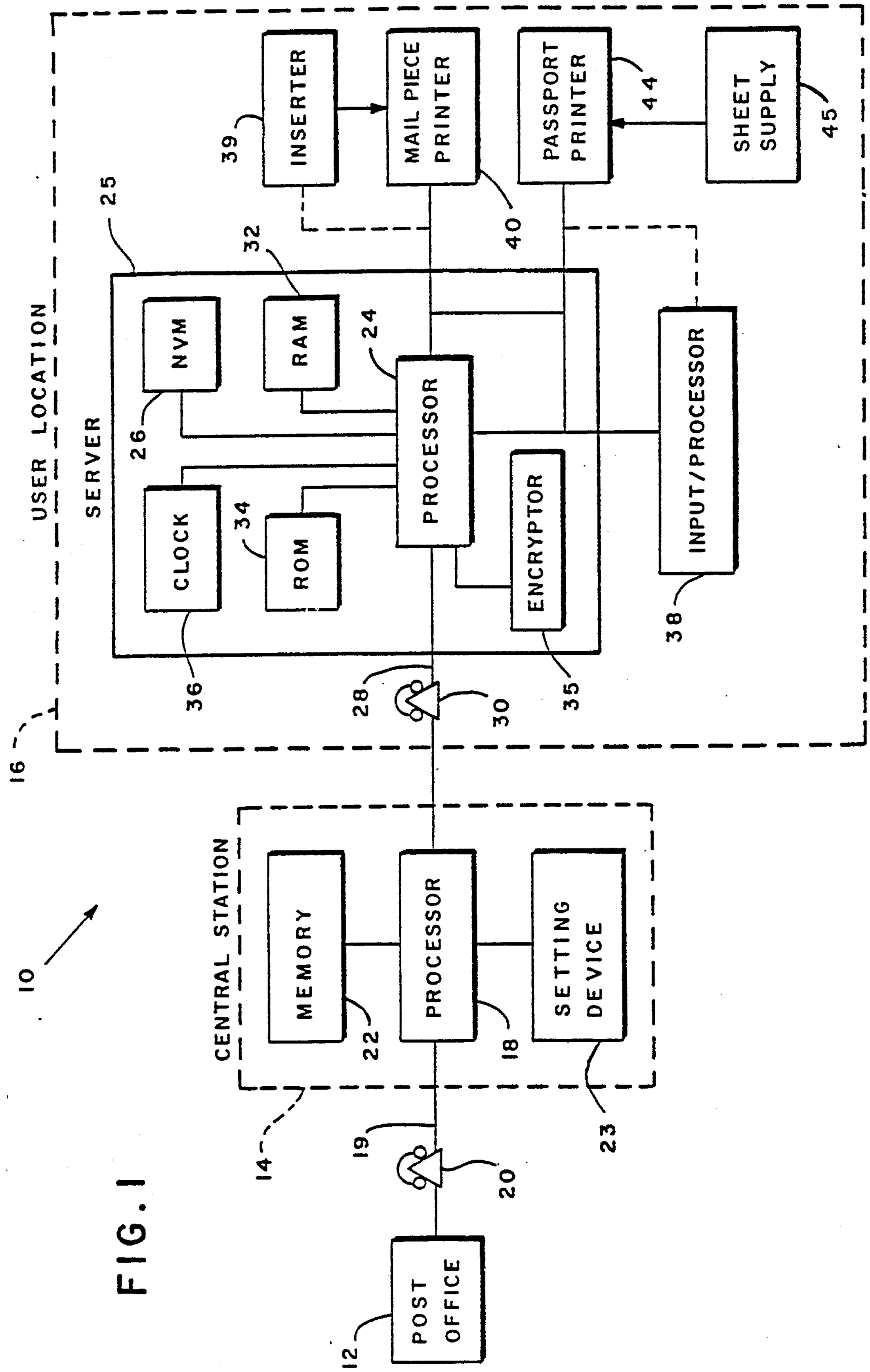
FIG. 1 is a block diagram of a batch mailing system.

Referring now to FIG. 1, a batch mailing system is shown generally at 10 and includes a post office 12, a central station 14 and a user location 16. The central station 14 has a processor 18. This processor 18 could be a main frame type of computer having substantial capacity. Communication is provided between the post office 12 and a plurality of central stations 14 (only one being shown) through a line or communication link 19 having a communication device such as a telephone 20 therein. Associated with the processor 18 and in connection therewith is a large storage memory unit 22 where large amounts of data can be stored and a register setting device 23 which includes encryption software of the type required in the resetting of postage meters remotely. Systems for the resetting of meters remotely are well known, see for example U.S. Pat. Nos. 3,792,446, 4,097,923 and 4,447,890.

A remote user location 16 as a secure unit 25 which will hereafter be referred to as a "server". The server 25 is supplied by the central station 14 to the user and includes a user processor 24 which may be a processor of much smaller capacity such as an Intel 8085 processor available from Intel Corporation, Santa Clara, Calif. Connected so the processor 24 is a memory 26. Preferably the memory 26 will be a non-volatile memory (NVM). The user processor 24 is connected to the central station processor 18 through a communication link or line 28. A telephone 30 or other communicating device may be disposed within the line 28 to thereby provide selective communication between the processors 18, 24. Also connected to the processor 24 are a RAM 32, a ROM 34, an encryptor 35 and a clock 36 whose respective functions will be described in detail hereinafter. An input/processor 38 is connected to the user processor 24 whereby data may be supplied, either manually or through a medium such as a disc or tape, to the user processor 24 for the purpose of providing data required in the processing of mail pieces. The input/processor 38 may be any of a large number of personal computers having keyboard and display which are commercially available, such as an IBM XT personal computer.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter or printer. The term "insert" includes bills, advertising materials, notices, etc., which are of a size to be received within an envelope or the like. High speed inserters of this type are readily available commercially, as for example Inserter model No. 3100 series from Pitney Bowes Inc., Stamford, Conn.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will be an unsecured, high speed printer which may be controlled either through the processer 24 or through the input/processor 38. A second printer 44, which is supplied with statement sheets 46 or other documents from a supply 45 thereof, is provided to print upon a statement sheet 46 or other document. This second printer 44 is preferably a secure printer that is provided by the central station 14. By secured is meant a device constructed in the same manner as a postage meter without access to the interiors thereof except by authorized personnel. An example of such a postage meter is a Model 6500 postage meter available from Pitney Bowes Inc., supra. Obviously, the second printer 44 can be an unsecured printer but this occasions greater risk in terms of verifying payment of mail. Throughout the balance of the specification and claims this statement sheet 46 will be referred to as a "passport". Details of the passport 46 will be described hereinafter in conjunction with FIG. 2.

Although only one user location 16 is shown and described, it will be appreciated that many user locations can serviced by each central station 14 as, for example, through multiplexing. The central station 14 may be the location of a postage meter manufacturer or other accountable organization.

In operation, the user at the user location 16 will be a sender of large quantities of mail and will be given an identification number by the central station 14, the identification number will be placed in the NVM 26 of the server 25. This identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server 25 has many of the characteristics of a postage meter, i.e., security, a descending register and the like, but certain elements are absent. The most evident absent element is a printer, the advantage of which is described throughout. Another absent member, in this embodiment is an ascending register. In a postage meter an ascending register is accessable only by a service representative of the meter manufacturer and may be used to determine if any meter tampering has taken place. As will be appreciated from the description that follows, the need for an ascending register in the server 25 is obviated. Following installation of the identification number, the user will communicate with the central station 14 through the telephone 30 for the purpose of indicating to the central station 14 the amount of postage value it wishes to have accredited to its memory 26. An access code will be given to the user that can be addressed to the setting device 23 through the touch dial of the telephone 30. Upon the receipt of the access code, the user will transmit to the central station 14 the access code and his identification number and the request for an amount of postage value. The setting device 23 will function to charge, or increase, the postage value into the memory 26. This memory 26 will include a descending register which is charged by the central station 14 with the selected amount of postage value. As the user location 16 processes mail, the postage value in the descending register will be decreased in accordance with the postage required to process the mail pieces 34. Devices for charging registers such as the descending registers are well known, as for example see U.S. Pat. Nos. 3,792,446, 4,097,923 and 4,447,890.

The balance of the server 25 includes the ROM 34 that contains information which formats address signals and stores a series of programs for controlling the functions of the server 25, a RAM 32 that will hold and supply real time data, a clock 36 that will provide the time and date and an encryptor 35 that will store the code required for the descending register setting functions. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

It will be appreciated that the printer 40 is a high speed, inexpensive, unsecured printer such as a ink jet printer or laser printer or any type of dot matrix printer which will apply the addresses of the addressee and addressor to the face of the mail pieces under command of the input/processor 38 in cooperation with the server 25. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user location 16 by the central station 14 everytime postage value is added to the server 25 and will be stored in the NVM 26. This transaction number will be the same for one or more batches of mail that are sent and will remain the same until such time as the descending register of the NVM 26 is recharged with postage value, at which time a new transaction number will be assigned and stored in the NVM 26 in place of the preceding transaction number. By changing the transaction number upon each recharge, an element is provided for verifying postage. The batch number is one assigned by the user through the input/processor 38 whereby a given batch of mail, i.e., mail of a particular type or character, will be identified by a number assigned by the user. In addition, a run number, which is a subset of the batch, may be given to identified particular segments of the batch.

When a batch of mail is to be sent, the user will supply mailing and verification information through the input/processor 38 into the user processor 24 which will transmit at least a portion of this information to the inserter 39. This information would include the number of mail pieces to be processed and number of inserts to be placed in each envelope. The time and date may be supplied to the printer 40 through the input/processor 38 by overriding the clock 36. This overriding is useful when future mail is being processed. The user processor 24 will then command the printer 40 to print the appropriate postage, time, date, transaction number and address on the mail pieces 42 for a particular run. This run will be given a number that is associated with the particular mail to be sent, which number will be printed on the envelopes 42 of that run. As the printer prints the appropriate information upon each mail piece, the number of mail pieces and amount of postage required will be determined by the processor 24. At the end of the run or batch, the second printer 44 will print authorization information upon a passport 46.

Figure 2:
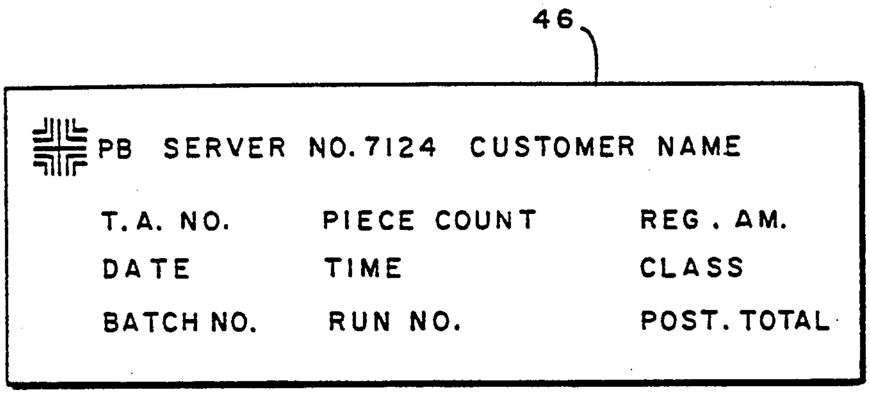
FIG. 2 is a plan view of an accounting statement that would accompany batch mail sent by the system of FIG. 1.

Referring now to FIG. 2, the passport 46 is shown after having printed thereon the total postage (Post. Total) required to mail the batch of mail, the transaction number(T.A. No.), piece count for a batch, descending register amount (Reg. Am.) after subtraction for the postage, the date, the time, the class, the batch number and the run number (optionally). Additionally, the server number, i.e., the identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if the server 25 is destroyed or the memory 26 therein is inadvertently erased, the user has means for verifying the amount of postage value remaining from that amount of postage value originally purchased and means for verifying the amount of postage value remaining from that amount of postage value originally purchased and stored. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from postage value stored in the descending register of the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that applicates the amounts in the descending register in the NVM 26 on an ongoing basis. By having the postage value contained within the memory 22 that corresponds to the value of the server 25, a check is constantly made to ensure that there is a correspondence between the passport 46 information and the amount of postage paid by the user. More specifically, the total amount credited to the user-location 16 will be stored in memory 22 and if the amount in the ascending register exceeds that total amount available to the user, the user location 16 will be notified that there are insufficient funds. When a batch of mail is sent to a post office for processing, the passport 46 for that particular batch will accompany the mail. The postal employee can determine whether it is an authorized transmission of mail from the information contained upon the accompanying passport 46. If there is any question on the part of the postal service as to whether the information is authentic, it will contact the central station 14 and through the line 19 obtain the information from the central station 14 to verify the information contained on the passport 46. If this information is accurate, then the postal service will know that the mail is authorized, i.e., the postage for the mail has been paid. On the other hand, if there is any discrepancy, the postal service is able to act to ferret any fraud or correct any discrepancy. As is the usual practice in the user of postage meters, a user location 16 will send all its mail to an assigned post office.

Figure 3:
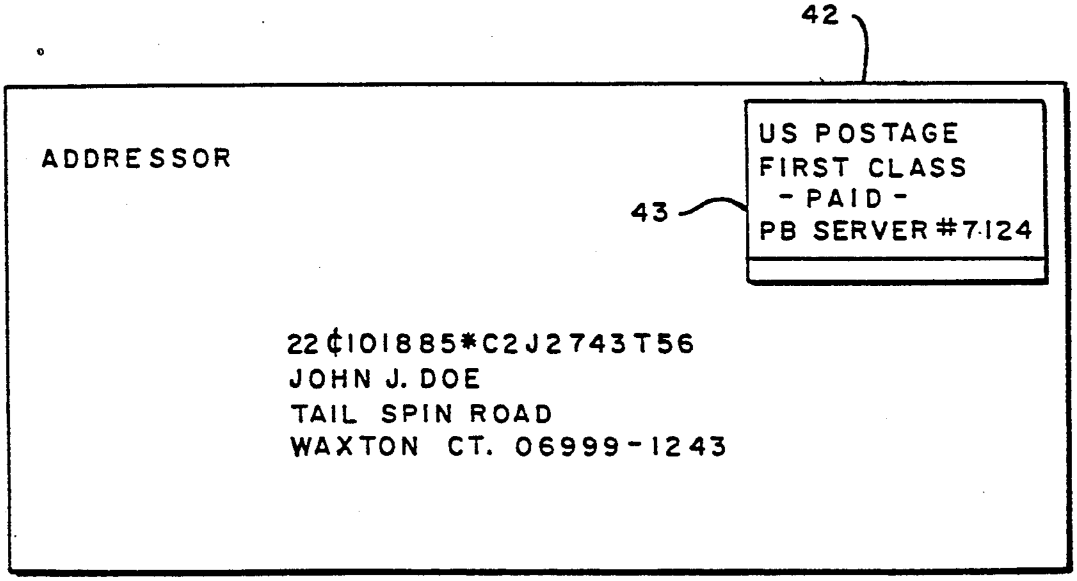
FIG. 3 is a plan view of an envelope containing information that would be applied thereto by the system of FIG. 1.
Figure 4:
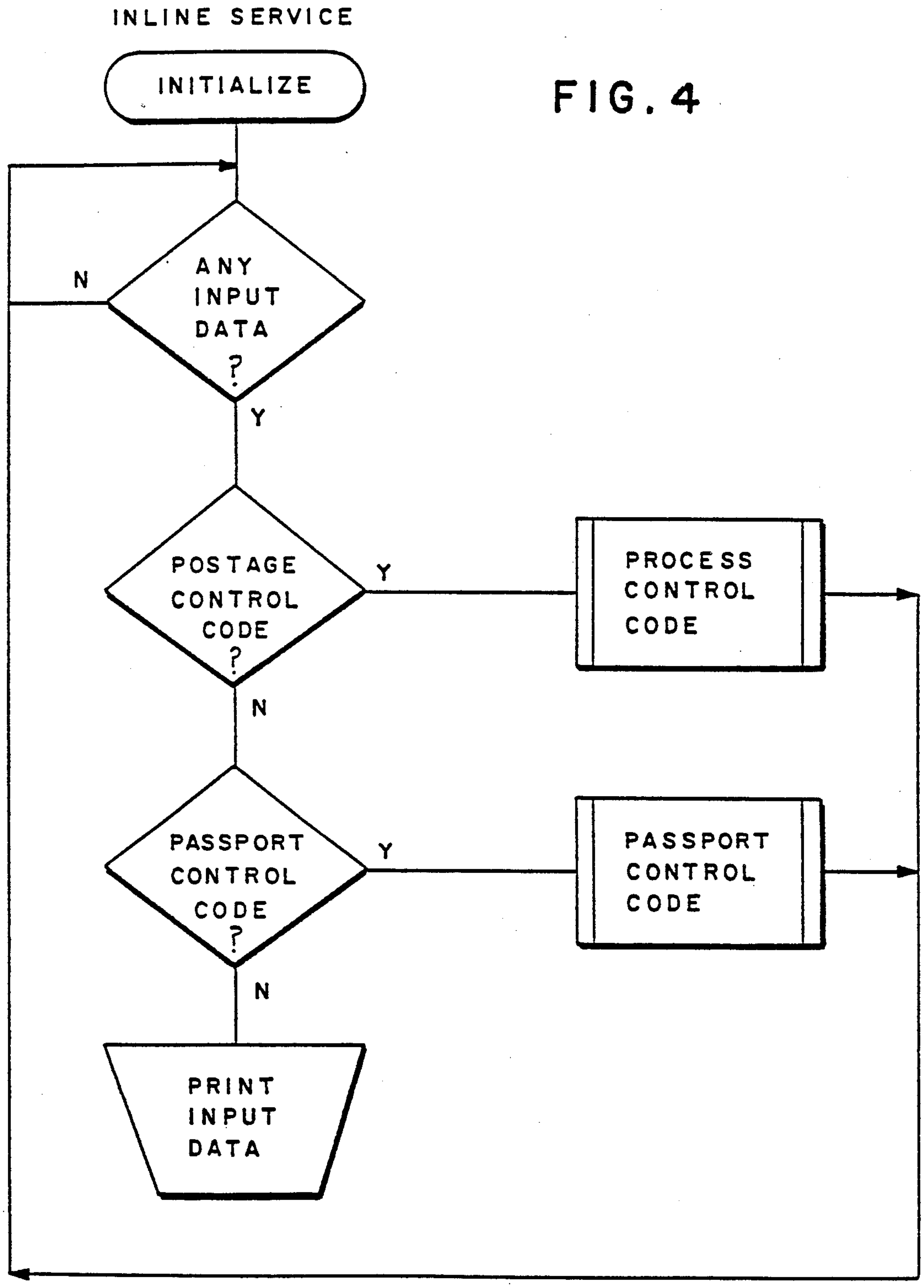
FIGS. 4–6 contain flow diagrams that describe the functions of the system shown in FIG. 1.
Figure 5:
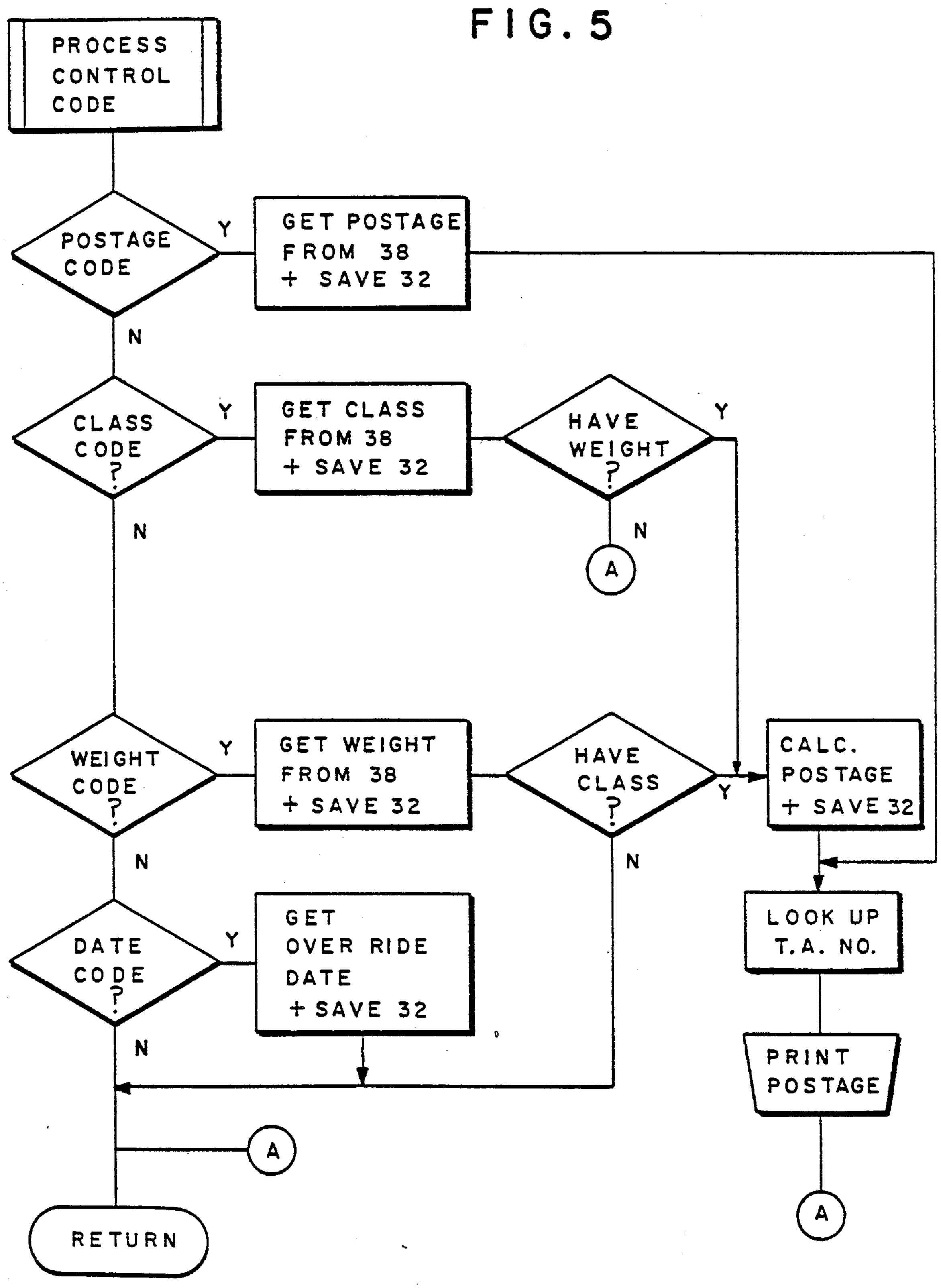
Figure 6:
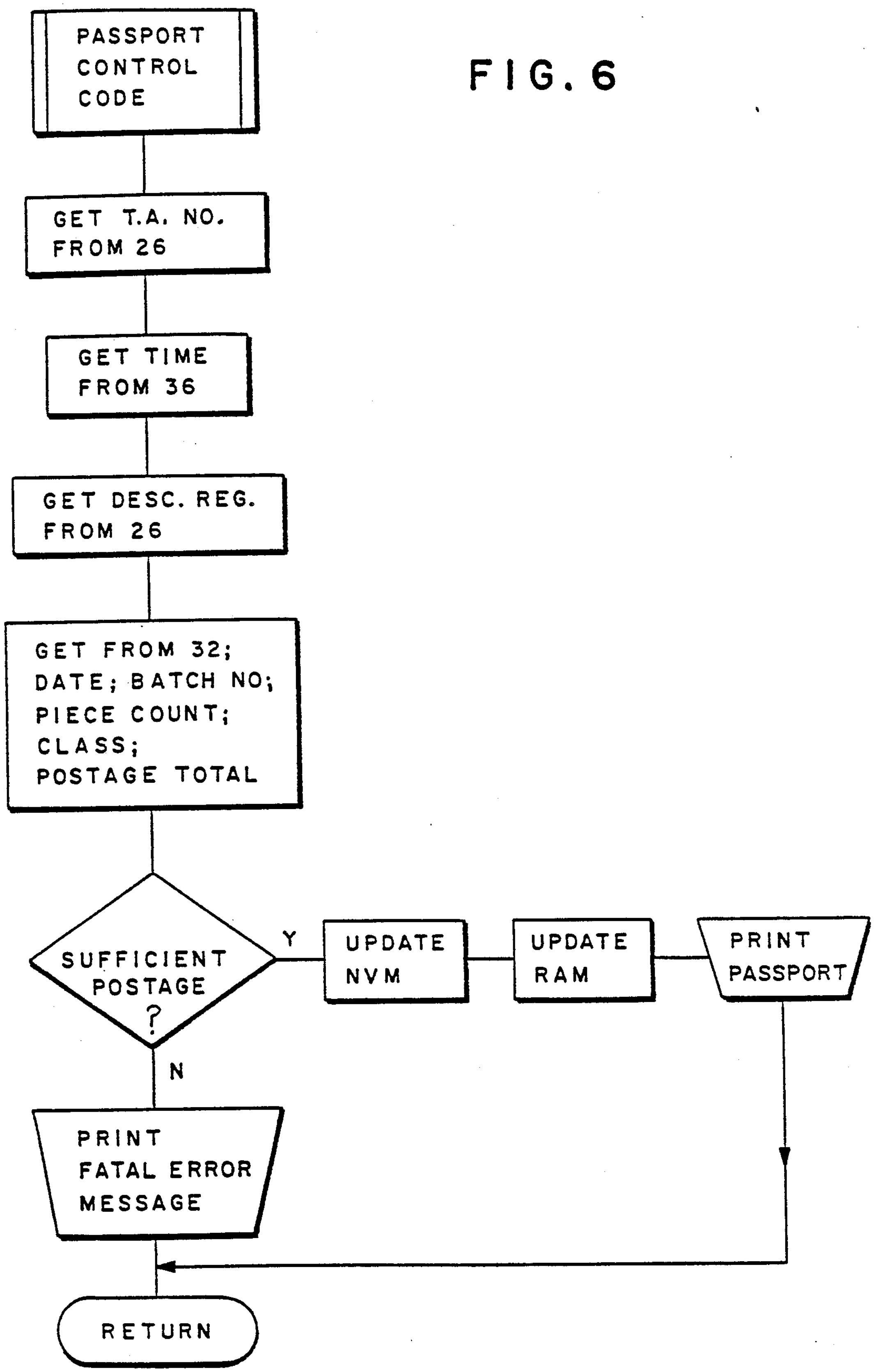

Referring now to FIG. 3, an envelope 42 is shown as it would be prepared by the present system 10. The upper left hand corner contains the address of the mail sender and the upper right hand corner contains a preprint block 43 containing the class of mail and gives the identification number or server number of the mail sender. This information may be preprinted on the envelopes 42 prior to processing of a batch. Such preprinting may be accomplished through direct communication of the input/processor 38 with the printer 44 without any participation of the other components of the user station 16.

In the processing of batch mail, the three address lines will first be printed in the address field with the name of the recipient, the street address and the city, state, zip code. The fourth line, or postage line is then printed using information supplied by the processor. This postage line, includes the postage amount $.22, the date, Oct. 18, 1985 and the transaction number, which in this case is C2J2743T56 . Other information may be given on this postage line if so desired including the time the mail is processed. Although the postage line is shown in alphanumerics it will be appreciated that the same may be printed in bar code and, optionally, bar code address information may be printed on the envelope as desired. Additionally, the information in the pre-print block 43 may be printed in the address field with the other information therein and the preprint block may be eliminated.

Although an envelope 42 shown has the postage and address information printed on the face thereof the same scheme will apply to a windowed envelope. In a windowed envelope it may be preprinted as previously described but instead of the printer 40 printing on the face of the envelope 42, an insert would be printed with the same information shown on the face of the envelope 42 and inserted so as to be viewed from the window. Alternatively, the postage and address information may be printed upon a label and the label may be attached to the envelope 42.

In this way what is provided is a method of allowing a organization to send large amounts of mail without having to frank every piece. In addition, the postal service is saved the problem of requiring on-site inspections at the user location 16 in order to verify that no unauthorized mail is being sent. By correlating the amount of postage, the transaction number, piece count, registration amount and the like, verification can be made without the need of encryption. The central station 14 more or less acts as a bank representing the postal service and handles the funds on its behalf as well as maintains records for verification. The funds or postage value charged to the server 25 may be either prepaid or charged to the user by the central station 14 on a credit arrangement. The central station 14 would be accountable to the postal service for the postage value placed in the server on a immediate basis. The central station 14 may be a postage meter or server 25 manufacturer or any other reliable entity.

Another advantage of this system is that the printer 40 that prints the large numbers of mail pieces is not part of a secure member, i.e., the server 25, as in the case of a postage meter. Because of this, the printer may be replaced frequently without the expense or inconvenience of entire replacement. It will be appreciated that one printer may be used in place of the two printers 40, 44 shown and described, but the preferred embodiment contemplates the user of two printers for the reasons given.

In accordance with all the foregoing, the following systems and methods have been described.

A system for processing mail with a verifiable statement, which comprises: a central station having a first processor, a first memory in communication with said first processor, a user station having an accounting unit including a second processor and a second memory unit in communication with said second processor, a communication link between said central station and said user station, a first printer in communication with said second processor, means for supplying mail pieces to said first printer, a second printer in communication with said second processor and means for supplying a sheet to said second printer. The aforesaid second memory may have a descending register for storing postage value, and the second memory may be non-volatile and contain an identification number. Further, the system may include, in addition to the aforesaid descending register, postage value setting means in communication with said first processor for adjusting the postage value amount in said descending register. Moreover, said mail piece supplying means may be an inserter operative to place inserts into mail pieces and convey the mail pieces to said first printer; or said first printer may be a high speed printer and said second printer a secure printer; or said first printer may be a dot matrix printer.

In addition there has been described a system for processing mail with a verifiable statement, which comprises: a central station having a first processor and a memory in communication with said first processor, a user station having an accounting unit including a second processor and a memory in communication with said second processor, a communication link between said central station and said user station, printing means in communication with said second processor, means for supplying mail pieces to said printing means, and means for supplying a statement sheet to said printing means. Further, the memory may include a descending register or, the memory may be non-volatile and contain an identification number.

Further, there has been described in a method of processing mail with a verifiable statement, the steps comprising: supplying postage value to a descending register of a memory from a central station, printing mail information upon each of a plurality of mail pieces, counting the number of mail pieces, determining the amount of postage required to mail the mail pieces, printing the postage amount for the total mail pieces and the number of mail pieces on a record member, subtracting the postage amount from the postage value in the descending register, and selectively communicating the postage amount and the number of mail pieces to the central station. This method may also include the steps of placing an identification number in the memory and printing the identification number on the mail pieces and the record member.

In addition, there has been described, in a system for applying postage to mail pieces that includes applying system identification, a combination comprising: a processor, means for inputting postage information to said processor, a non-volatile memory in communication with said processor, means for storing an identification number in said non-volatile memory, postage printing means in communication with said processor, means for supplying at least one item to said postage printing means printer, and means for actuating said printer to print postage and said identification number on said item. Further, in this system, said item may be either a mail piece or a statement sheet.

Moreover, there has been described a system for transmitting postage value, comprising: a central station having a first processor and a first memory in communication with said first processor, said first memory being operative to have postage value stored therein, a user station having an accounting unit including a second processor and a second memory in communication with second processor, said second memory having a descending register therein operative to receive a store postage value and dispense postage value upon command, a communication link between said central station and said user station, means for applying postage to mail, means for reducing the postage value stored in said descending register in response to said postage applying means, and means for transferring through said communication link postage value applied by said postage applying means. And, in this system, the first and second memories may be non-volatile, or the first memory may include a ascending register.

Still further, there has been described, a method for transmitting postage value, which includes the steps comprising: storing postage value in a first memory, transferring at least of portion of the postage value to a second memory, applying postage to mail, reducing the postage value stored in said second memory, and transferring at least a portion of the postage value in the second memory to the first memory. In addition, in a postage generating system, there has been described a combination which comprises: a central station for compiling postage data, means for generating postage data, means for printing said postage data, and means for transmitting said postage data postage value, there has been described the steps which comprise: compiling postage value, generating postage data, printing the postage data, transmitting said postage data to a remote station, and adjusting the compiled postage value in response to the transmitted postage data.

What is claimed is:

1. A method of processing mail pieces forming a batch of mail and accounting for postage required for such mail, the method comprising the steps of:
- storing a postage value and a unique identification number for said batch of mail;
- printing mail data including said unique identification number on each mail piece of a batch of mail pieces with a first printer;
- printing said unique identification number and postage data indicating the total amount of postage required to mail said mail pieces of said batch on a statement sheet with a second printer separate from said first printer; and
- subtracting said total postage amount from said stored postage value.

2. A mail system method for processing mail, comprising the steps of:
- supplying postage value from a central station to a remotely located user location and storing said postage value in a descending register at said user location;
- printing at said user location mailing information on each of a plurality of mail pieces of said batch thereof;
- counting at said user location the number of mail pieces of said batch of mail pieces;
- determining at said user location the total amount of postage required to mail said batch of mail pieces;
- printing on a record member at said user location the total amount of postage required to mail the mail pieces of said batch thereof;
- subtracting said total postage amount from said postage value in the descending register; and
- selectively communicating from said user location to said central station said total postage amount and said counted number of mail pieces of said batch of mail pieces to permit verification with said central station of the total postage amount printed on said record number.

3. The method of claim 2 including the steps of storing an identification number in said memory and printing said identification number on each of said mail pieces and said record member.

4. A system for processing a plurality of mail pieces forming a batch of mail comprising: an accounting unit, said accounting unit including a first processor and a first memory in communication with said first processor; means for printing, said printing means connected in communication with said first processor; means for supplying said plurality of mail pieces of said batch to said printing means; means for supplying a sheet to said printing means; and said first processor controlling said printing means to print postal information on the respective mail pieces of said batch, said postal information including an identification number for said batch; and said first processor controlling said printing means to print a verifiable statement including said identification number and a total of postage required for mailing said batch on said sheet to permit verification of the total postage for said small pieces of said batch.

5. The system of claim 4, wherein said printing means includes first and second printers, said mail pieces supplying means supplying said mail pieces to said first printer, and said sheet supplying means supplying said sheet to said second printer.

6. The system of claim 4, wherein said first memory is a non-volatile memory having stored therein said identifications number.

7. The system of claim 4, wherein said mail pieces supplying means includes an inserter for conveying said mail pieces to said first printer.

8. The system as claimed in claim 4, wherein said verifiable statement on said statement sheet includes information concerning said batch of mail pieces.

9. The system as claimed in claim 8 further including: means for transferring said information to a central station.

10. The system as claimed in claim 8 further including: means for automatically transferring said information to a central station.

11. The system as claimed in claim 8 further including: means for automatically transferring said information to a central station after said mail pieces are processed.

12. The system of claim 4, wherein said first memory includes a descending register for storing a postage value amount.

13. The system of claim 12 further including means, remotely located from said accounting unit and selectively connectable in communication wit said first processor, for adjusting the postage value amount stored in said descending register.

14. The system of claim 4, wherein said printing means includes:
- a first printer for printing said postal information on said mail pieces; and,
- a second printer for printing said verifiable statement on said sheet.

15. The system of claim 14, wherein said first printer is a high speed printer and said second printer is a secure printer.

16. The system of claim 15, wherein said first printer is a dot matrix printer.

17. The system of claim 14 further comprising:
- a central station, said central station including a second processor and a second memory in communication with said second processor;
- means for establishing a communication link between said first and second processors; and
- said first processor communicating said verifiable statement to said second processor for storing in said second memory, and said verifiable statement printed on said sheet to permit verification thereof with said verifiable statement stored at said central station.

18. The system of claim 17, wherein said central station includes means, in communication with said second processor, for adjusting the postage value amount stored in said descending register of said first memory.

19. The system of claim 18, wherein said second memory includes an ascending register for storing accumulated postage charges.

20. A system for processing mail pieces forming a batch of mail and accounting for postage required for such mail, said system comprising:

a processor, memory means connected in communication with said processor for storing a postage value;

first printing means controlled by said processor for printing mail piece data on respective mail pieces of a batch thereof, said mail piece data including a unique identification number;

second printing means controlled by said processor and separated from said first printing means for printing on a statement sheet said unique identification number and postage data indicating the total amount of postage required to mail said batch of mail pieces; and, said processor including means for subtracting said total postage amount from said stored postage value.

21. The system as claimed in claim 20, wherein said unique identification number is a batch number.

22. The system as claimed in claim 20, wherein said unique identification number is a transaction number.

23. The system as claimed in claim 20, wherein said unique identification number is a run number.

24. A system for processing mail, comprising:

a central station for receiving data;

a user location, remote from said central station, said user location including an accounting unit, said accounting unit including a first processor, said accounting unit including a first memory having a postage value stored therein, said first memory connected in communication with said first processor;

means, at said user location, for generating mail piece data including postage value data and batch data related to the total cost for mailing a batch of mail pieces;

means, at said user location, for printing said mail piece data on each of a plurality of mail pieces;

means, at said user location, for supplying said mail pieces to said printing means;

means, at said user location, for supplying a statement sheet to said printing means, said printing means printing a verifiable statement including said batch data on said statement sheet for subsequent verification of payment of postage for said mail pieces;

means, at said user location, for subtracting said postage value data from said stored postage value; and means, at said user location, for communicating said batch data to said central station to permit said batch data on said statement sheet to be verified with the batch data at said central station.

* * * * *